(12) United States Patent
Tanaka

(10) Patent No.: US 6,208,811 B1
(45) Date of Patent: Mar. 27, 2001

(54) AUTOMATIC FOCUSSING SYSTEM

(75) Inventor: Tsunefumi Tanaka, Kanagawa-ken (JP)

(73) Assignee: Canon Kabuhsiki Kaisha, Tokyo (JP)

( * ) Notice: Subject to any disclaimer, the term of this patent is extended or adjusted under 35 U.S.C. 154(b) by 0 days.

(21) Appl. No.: 07/573,270

(22) Filed: Aug. 27, 1990

Related U.S. Application Data

(63) Continuation of application No. 07/453,170, filed on Dec. 26, 1989, now abandoned, which is a continuation of application No. 07/193,218, filed on May 11, 1988, now abandoned, which is a continuation of application No. 06/913,343, filed on Sep. 30, 1986, now abandoned.

(30) Foreign Application Priority Data

| | | |
|---|---|---|
| Oct. 2, 1985 | (JP) | 60-219521 |
| Mar. 17, 1986 | (JP) | 61-058541 |
| Mar. 17, 1986 | (JP) | 61-058543 |

(51) Int. Cl.$^7$ ............................. G03B 3/00; G03B 13/22
(52) U.S. Cl. ............................................. 396/91; 396/75
(58) Field of Search .................................... 354/400, 402, 354/407, 408; 396/75, 91

(56) References Cited

U.S. PATENT DOCUMENTS

| | | | |
|---|---|---|---|
| 4,440,482 | 4/1984 | Shenk | 354/195.1 |
| 4,500,778 | 2/1985 | Kusaka et al. . | |
| 4,509,842 | 4/1985 | Taniguchi et al. . | |
| 4,537,487 | * 8/1985 | Taniguchi et al. | 354/286 X |
| 4,550,993 | 11/1985 | Taniguchi et al. . | |
| 4,611,244 | * 9/1986 | Hanma et al. | 358/227 |
| 4,623,238 | * 11/1986 | Taniguchi et al. | 354/402 X |
| 4,639,112 | 1/1987 | Nakai et al. . | |

FOREIGN PATENT DOCUMENTS

| | | |
|---|---|---|
| 3217884 | 12/1982 | (DE) . |
| 2019589 | 10/1979 | (GB) . |
| 2033593 | 5/1980 | (GB) . |
| 2043277 | 10/1980 | (GB) . |
| 2139368 | 11/1984 | (GB) . |
| 57-93326 | 6/1982 | (JP) . |
| 57-165821 | 10/1982 | (JP) . |
| 58-166330 | 10/1983 | (JP) . |
| 58-217907 | 12/1983 | (JP) . |
| 58-224317 | 12/1983 | (JP) . |
| 59-9610 | 1/1984 | (JP) . |
| 59-140408 | 8/1984 | (JP) . |
| 59-151116 | 8/1984 | (JP) . |
| 60-12526 | 1/1985 | (JP) . |

* cited by examiner

Primary Examiner—Russell Adams
(74) Attorney, Agent, or Firm—Fitzpatrick, Cella, Harper & Scinto

(57) ABSTRACT

An automatic focussing system including a photographic lens having a memory for storing informations ($S_0$, A) concerning focussing of the photographic lens, a focus detecting unit for detecting a magnitude (d) of focus deviation of the photographic lens, an operation circuit for producing a magnitude of movement required to attain correct focussing of the photographic lens on the basis of the above-mentioned informations and the magnitude of focus deviation, and a driving unit for driving the photographic lens according to an output of said operation circuit, thereby attaining an optimum focussed state in a short time.

50 Claims, 10 Drawing Sheets

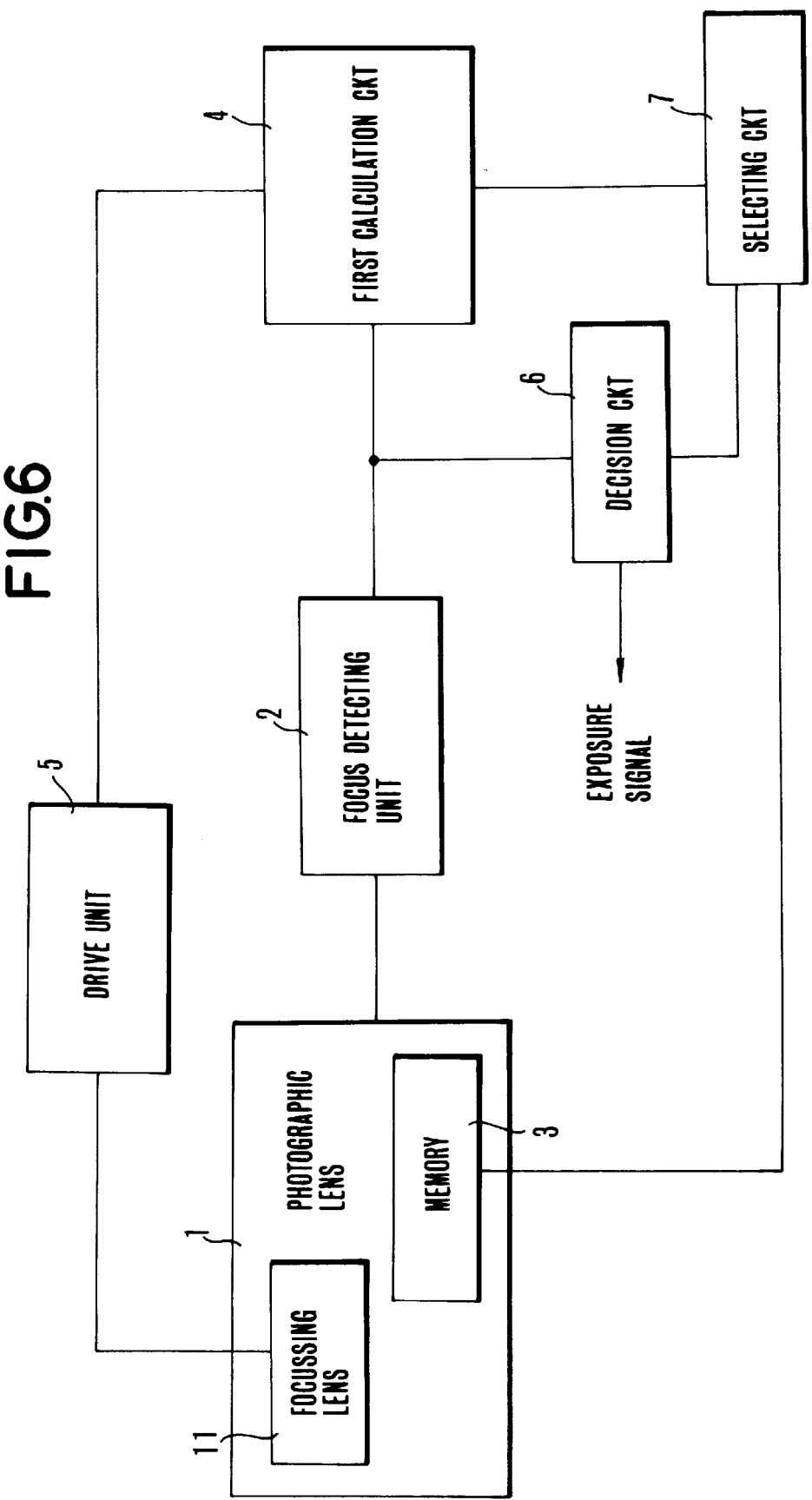

AUTOMATIC FOCUSSING SYSTEM

This application is a continuation of application Ser. No. 07/453,170 filed Dec. 26, 1989, now abandoned, which is a continuation of application Ser. No. 07/193,218 filed May 11, 1988, now abandoned, which is a continuation of application Ser. No. 06/913,343 filed Sep. 30, 1986, now abandoned.

BACKGROUND OF THE INVENTION

1. Field of the Invention

The present invention relates to an automatic focussing system and, more particularly, it relates to an automatic focussing system suitable for use in a photographing camera, a video camera or the like in which a magnitude of focus deviation, corresponding to a defocus, produced particularly when an image is produced through an exchangeable lens system, is detected and a focussing lens of a photographic lens system is adjusted according to the detected magnitude of deviation of focussed position to attain the focussed state.

2. Description of the Related Art

An automatic focussing system in which a focus error of a photographic lens system is detected by focus detecting means provided in a camera body and a focussing lens of the photographic lens system is adjusted according to an output signal produced by said focus detecting means to effect focussing operation has been proposed, such as in Japanese Laid-Open Patent Applications No. Sho 55-11275 and No. Sho 59-151116, etc.

In general, a non-linear relation exists between a magnitude of focus deviation of a photographic lens system (a deviation of an image surface at the time of detection from a predetermined image plane) and a magnitude of movement of a focussing lens which is required to attain correct focussing of the photographic lens system. In case of a mono-focal photographic lens system, for example, the magnitude of focus deviation varies, depending upon such factors as an object distance, etc. In case of a variable-power lens system, the magnitude of focus deviation varies, depending upon such factors as an object distance, a position of a focussing lens along its optical axis, a zooming position, etc.

Such a variation of the magnitude of focus deviation is caused because the ratio $\Delta x'/\Delta x$ ($\Delta x$ is a minute magnitude of movement of the focussing lens along its optical axis and $\Delta x'$ is a magnitude of movement in axial direction of position of an image surface), that is sensitivity S, varies, depending upon respective elements of the photographic lens system and photographing conditions.

For example, it is assumed that there is a focus deviation $\Delta d$ in a mono-focal photographic lens system and focussing of this lens system is effected by moving the lens system as a whole. Then, if the lens system is moved by a distance equal to $\Delta d$, correct focussing cannot be attained and an error in focussing is produced. Such an error in focussing becomes larger as an object to be photographed is located nearer to the lens system.

Next, it is assumed that there is a focus deviation $\Delta d$ in a variable-power photographic lens system in which a first group of lenses at the side of an object constitutes a focussing lens and includes a variable-power variable from f=1 to f=4, for example, and a magnitude of movement of the focussing lens at the time of f=1 is $\Delta x_W$. Then, if the power is changed from f=1 to f=4, the magnitude of movement of the focussing lens $\Delta x_T$ changes to $\Delta x_T = \Delta x_W/4^2$. Thus, it will be clear that the magnitude of movement of the focussing lens changes, depending upon the zooming position of the variable-power system, namely the selected power of the variable-power system, even if the magnitude of focus deviation is the same.

On the other hand, at the time when the focussing lens group of the photographic lens system is located at the position where it is focussed to an object at infinite distance and at the time when said focussing lens group is located at the position where it is focussed to a nearer object, the magnitude of movement of the focussing lens required to attain the correct focussing is different, even if the magnitude of deviation of focussed position is the same.

Furthermore the required magnitude of movement of the focussing lens changes, depending upon the object distance, even if the magnitude of deviation of focussed position is the same.

On the reasons as mentioned above, the precise focus detection cannot be attained without deciding the required magnitude of movement of the focussing lens while considering several factors of the photographic lens system, even if the magnitude of deviation of focussed position is detected by the focus detecting means.

Heretofore, in case of the mono-focal lens system, the focussing was effected by moving the focussing lens by the magnitude of focus deviation $\Delta d$ or the corresponding magnitude. In case of the variable-power system, the focussing was effected by moving the focussing lens by the magnitude $\Delta x$ which was determined according to the formula of $\Delta d/S_Z$. In this case, only the sensitivity $S_Z$ at the respective zooming positions was taken into consideration. In such conventional system, there occurred substantial amount of error in movement of the focussing lens and it was difficult to attain precise focussing by only one time of movement of the focussing lens. According to the prior art, therefore, it was necessary to repeat the movement of the focussing lens a few times to progressively attain the precisely focussed position. Thus the time to attain the focussed position is increased, so that it is difficult to effect a photographing operation in a rapid and precise manner.

SUMMARY OF THE INVENTION

It is an object of the present invention to provide an automatic focussing system in which a magnitude of deviation of focussed position of a photographic lens system as well as various optical factors peculiar to the photographic lens system are taken into consideration and subjected to calculation to decide a precise magnitude of movement of the focussing lens required to attain the correct focussing, whereby the focussing is effected in a rapid and precise manner.

In accordance with the present invention there is provided an automatic focussing system comprising an objective lens; focus detecting means for detecting focus deviation of said objective lens; memory means, included in said objective lens, for storing informations including a value of a reference factor peculiar to said objective lens and a value of a coefficient relating to a magnitude of said focus deviation; operation means for determining a magnitude of focus adjustment by introducing said value of a reference factor, said value of a coefficient and said magnitude of focus deviation into an equation formula wherein a reference factor is added to a coefficient factor of the focus deviation; and drive means for driving said objective lens in accordance with an output of said operation means.

BRIEF DESCRIPTION OF THE DRAWINGS

FIGS. 6, 7 and 8 are block diagrams showing other embodiments of the present invention.

DETAILED DESCRIPTION OF THE PREFERRED EMBODIMENTS

Now the present invention will be described with reference to the accompanying drawings which illustrate the preferred embodiments of the present invention.

Figure 1A:
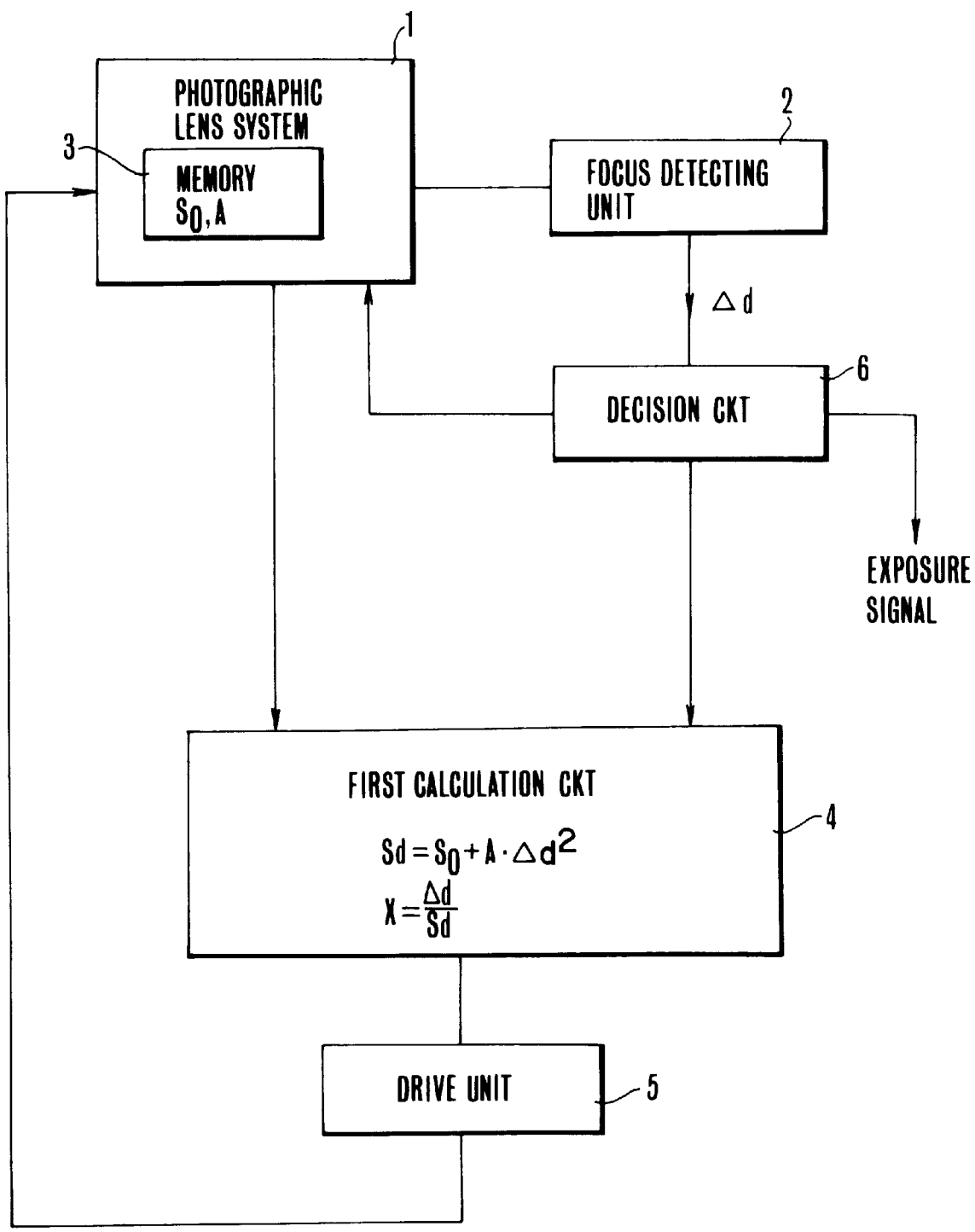
FIG. 1 is a block diagram showing an embodiment of the automatic focussing system according to the present invention.
FIG. 1B illustrates a single-lens reflex camera having a mono-focal lens to which the present invention is applied.
FIG. 1C illustrates a focus detecting unit used in the camera own in FIG. 1B.
Figure 1B:
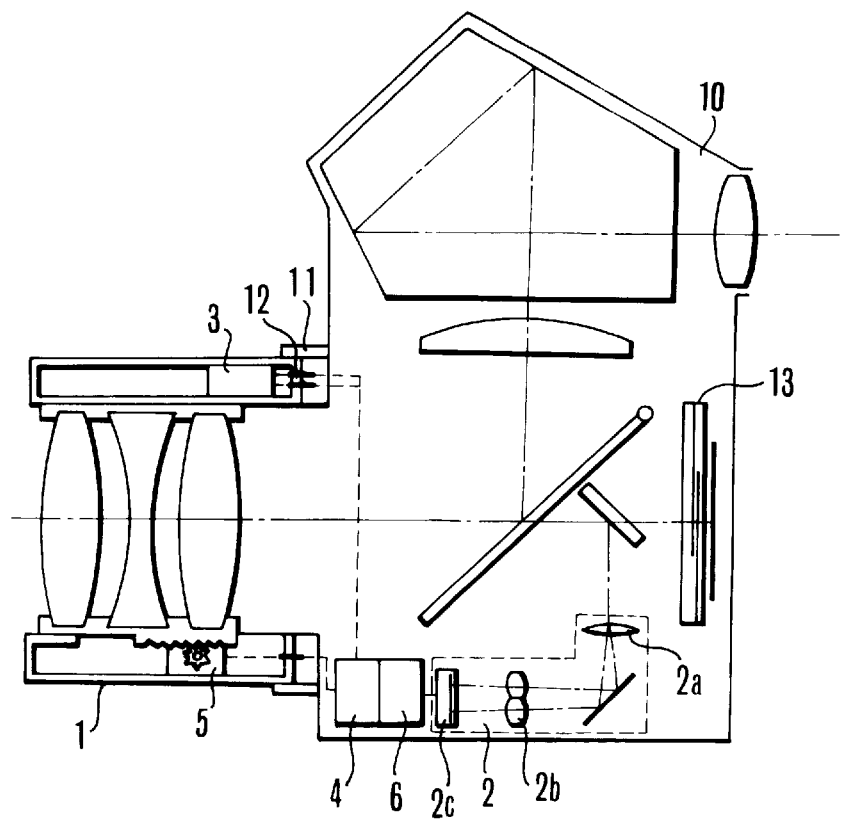

FIG. 1A is a block diagram showing the automatic focussing device according to an embodiment of the present invention. FIG. 1B illustrates a single-lens reflex camera using a mono-focal lens to which the automatic focussing device of the present invention is applied. The device shown in FIG. 1 includes a photographic lens system 1, a focus detecting unit 2, a first calculation circuit 4, a drive unit 5 and a decision circuit 6.

The photographic lens system 1 includes an image producing system of mono-focal type or variable-power type, etc., and this system is constructed to effect a focussing operation by moving the lens system as a whole or moving a focussing lens provided for this purpose.

Figure 1C:
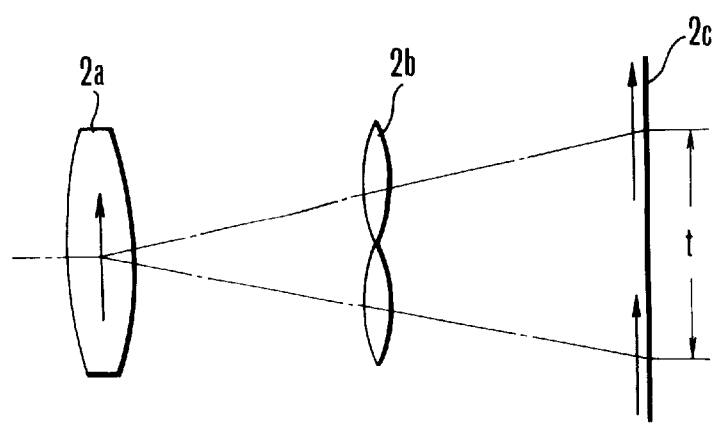

The focus detecting unit 2 is constructed to detect a magnitude of defocus from a predetermined image plane produced by the photographic lens system or a magnitude of focus deviation from the predetermined image plane which corresponds to said magnitude of defocus. The focus detecting unit may adopt any one of several systems. FIG. 1C shows an example of such focus detecting unit. The unit shown in FIG. 1C consists of a field lens $2a$ positioned on the predetermined image surface, two image reforming lenses $2b$ and a photosensor array $2c$, which are successively arranged in this order. A pair of images are formed on the photosensor array $2c$ and the distance between these reformed images depends upon the degree of the focus adjustment of the photographic lens. By comparing the distance between the reformed images with a reference distance t, it can be decided whether the image is formed on the predetermined image surface or at its front or rear side. It is also possible to calculate the magnitude of deviation on the basis of the difference between the reference distance t and the distance between the reformed images.

A memory 3 including ROM or the like is arranged in the photographic lens system and it stores various factors concerning the optical characteristics of the photographic lens system, such as reference factor sensitivity of the lens system, concerning the movement of the focussing lens. This memory may be formed by a mechanical construction.

The first calculation circuit 4 acts to produce a coefficient of movement Sd, which corresponds to a sensitivity according to which the focussing lens is to be moved, on the basis of the reference factors or the like stored in the memory 3 and the magnitude $\Delta d$ of focus deviation detected by the focus detecting unit 2. Said circuit further acts to produce a magnitude of movement x of the focussing lens required to attain the correct focussing, in accordance with said coefficient of movement Sd.

The drive unit 5 includes a motor, a rack-and-pinion mechanism or the like, to move the focussing lens to a distance determined as the result of the operation of the first calculation circuit 4.

As shown in FIG. 1B, the photographic lens system 1 is detachably connected to a camera body 10 by a coupling 11 and electrically connected thereto by means of an electrical connector 12. The camera has a shutter 13.

As described before, the magnitude of movement of the focussing lens relative to the magnitude of focus deviation varies, depending upon the object distance, the initial position of the focussing lens along its optical axis, zooming position, etc.

For example, even if the object distance is the same, the magnitude of focus deviation detected by the focus detecting unit depends upon the position of the focussing lens along its optical axis.

Figure 2A:
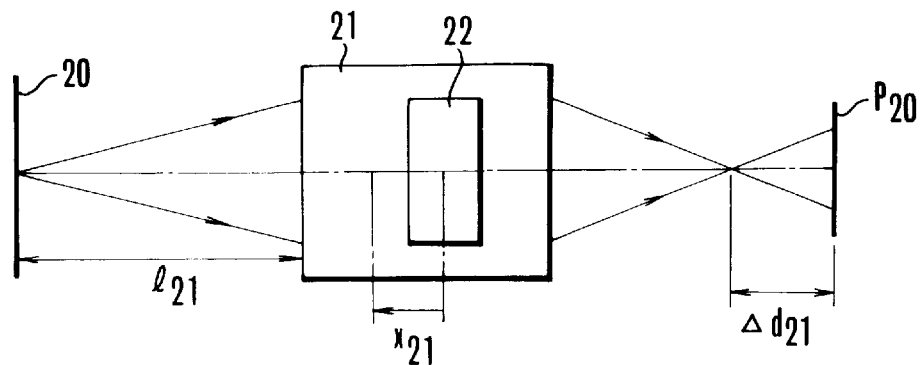
FIGS. 2 and 2B are diagrammatic views for explaining the relations between a magnitude of deviation of a focussed position and a magnitude of movement of a focussing lens.
FIGS. 2C, 2D and 2E are diagrams showing relations between the magnitude of focus deviation and the magnitude of movement of the focussing lens.

Now it is assumed that the distance between the object 20 and the lens system 21 is $l_{21}$ and the distance between the current position of the focussing lens 22 and the position where said lens is to be located to attain the focussed state is $x_{21}$, as shown in FIG. 2A. Then, the relation between the magnitude of focus deviation $\Delta d_{21}$ detected by the focus detecting unit and the magnitude $x_{21}$ of movement of the focussing lens is as shown in FIG. 2C. The magnitude $\Delta d_{21}$ of focus deviation corresponds to the area enclosed in $a_{21}$ - $a_{22}$ - $a_{23}$ - $a_{24}$.

Figure 2B:
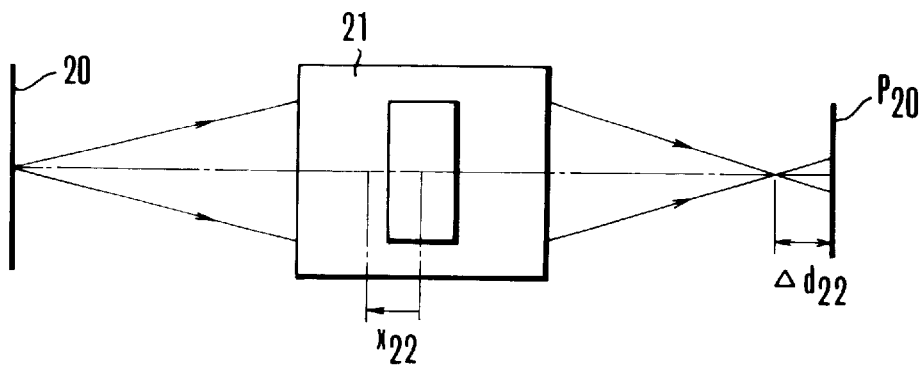
Figure 2C:
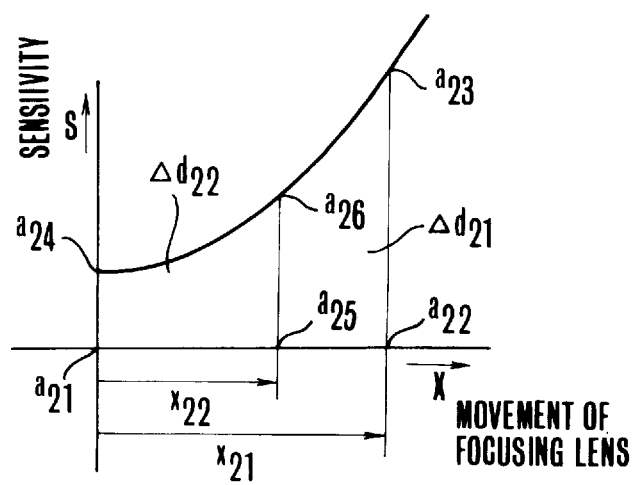

On the other hand, if it is assumed that the distance of the current position of the focussing lens and the position where said lens is to be located to attain the focussed state is $x_{22}$, as shown in FIG. 2B, the magnitude of focus deviation $\Delta d_{22}$ detected by the focus detecting unit corresponds to the area enclosed in $a_{21}$ - $a_{25}$ - $a_{26}$ - $a_{24}$. In FIGS. 2A and 2B, $P_{20}$ indicates the predetermined image plane and 20 indicates the object. Thus, it will be clear that in the general photographic lens system the magnitude of focus deviation $\Delta d$ and the magnitude of movement of the focussing lens x hold a non-linear relationship with each other.

In accordance with the present invention, such non-linear relationship between the magnitude of focus deviation and the magnitude of movement of the focussing lens is taken into consideration at the time of deciding the magnitude of movement of the focussing lens on the basis of the magnitude of focus deviation. For this purpose, a coefficient of movement Sd $\Delta d$ of deviation of focussed position is defined and the magnitude of movement is decided on the basis of such coefficient of movement Sd and the magnitude of deviation $\Delta d$.

Firstly, the operation of the present invention will be explained, with reference to the mono-focal photographic lens system.

Referring to FIGS. 1A, 1B and 1C, the magnitude of deviation of focussed position Δd of the photographic lens system is detected by the focus detecting unit 2 at the first step of the releasing operation of the shutter. Whether the magnitude Δd is within the allowable range peculiar to the photographic lens system or not is decided by the decision circuit 6. If the magnitude Δd falls within said allowable range, an output signal is fed to open the shutter 23. If the magnitude Δd falls outside of the allowable range, the magnitude Δd is fed to the first calculation circuit 4.

If the magnitude Δd is outside of the allowable range, a reference factor $S_0$ peculiar to the photographic lens system and a constant number A body, information concerning are fed to the first arithmetic circuit from the memory 3 of the photographic lens system, on the basis of the signal fed from the decision circuit 6. In case of the mono-focal lens system, said reference factor $S_0$ and the constant number A have predetermined values.

In the first calculation circuit 4, the reference factor $S_0$, the constant number A and the magnitude of focus deviation Δd are taken into consideration and the coeffcient of movement Sd is determined, using a function f(Δd) of the magnitude of deviation Δd, according to the following equation formula:

$$Sd = S_0 + A \times f(\Delta d) \quad (1)$$

The magnitude of movement x of the focussing lens is determined, on the basis of the coefficient of movement Sd as determined by the formula (1) and the magnitude of deviation Δd, according to the following formula:

$$x = \Delta d / Sd \quad (2)$$

The focussing lens is driven by the drive unit 4 according to the output of the first calculation unit 4.

Figure 3A:
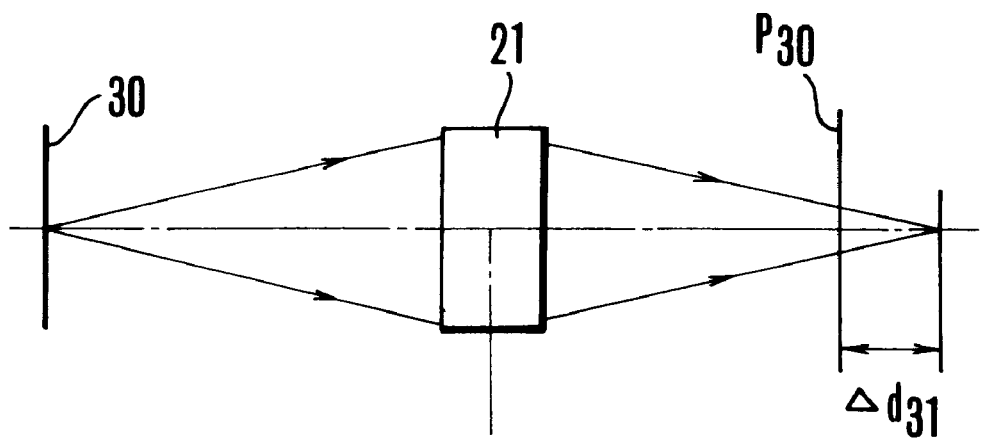
FIGS. 3 and 3B are diagrammatic views for explaining the relation between the magnitude of focus deviation and the magnitude of movement of the focussing lens in a conventional system.
Figure 3B:
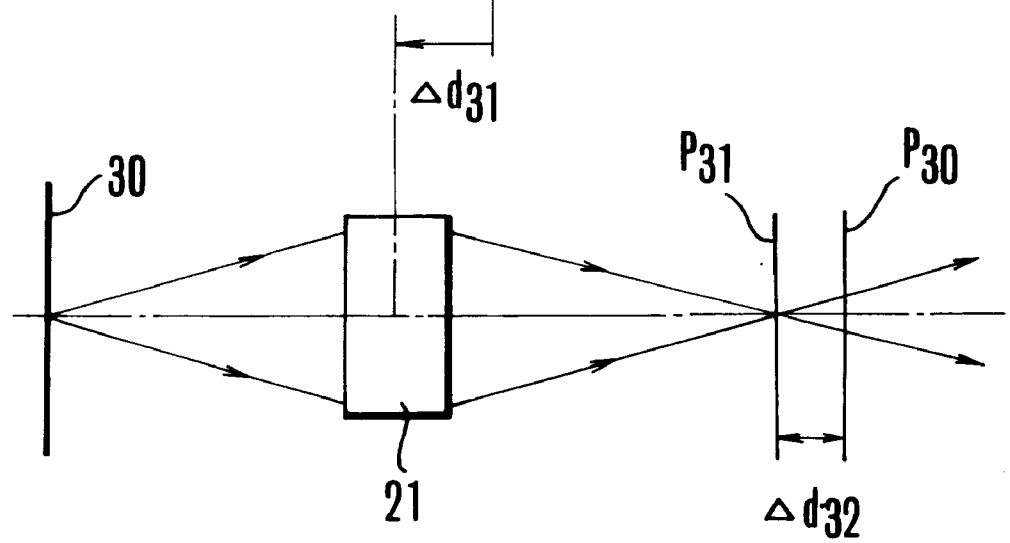

In the conventional automatic focussing system, as shown in FIGS. 3A and 3B, which is constructed to effect focussing operation by moving the photographic lens system as a whole, for example, if the magnitude of focus deviation detected by the focus detecting unit is $\Delta d_{31}$, as shown in FIG. 3A, the photographic lens system is moved by the distance corresponding to $\Delta d_{31}$, as shown in FIG. 3B. In such case, the distance of movement is greater than required to attain the correctly focussed state, so that an image of an object 30 is produced at a position $P_{31}$ which is deviated by $\Delta d_{32}$ from a predetermined image plane $P_{30}$. Accordingly, it becomes necessary to effect the focus detecting operation again.

According to the embodiment as described above, the magnitude of focus deviation detected by the focus detecting unit 2 is corrected by using the reference factor $S_0$ corresponding to the sensitivity of the photographic lens and the coefficient A, and then the magnitude of movement of the focussing lens is determined on the basis of these factors. For example, in the above-mentioned embodiment, the function f(Δd) in the formula (1) is expressed by a quadratic, and the coefficient of movement Sd is determined by the following formula:

$$Sd = S_0 + A \cdot \Delta d^2 \quad (3)$$

or $$Sd = S_0 + B \cdot \Delta d + C \cdot \Delta d^2 \quad (3)'$$

The magnitude of movement x of the focussing lens is determined, on the basis of said coefficient of movement Sd and the magnitude of focus deviation Δd, according to the formula (2). In the above formula (3), the reference factor $S_0$ is, for example, the sensitivity of the photographic lens system for an object positioned at a standard distance. The formula (3) and (3)' may be generalized as:

$$Sd = S_0 + \sum_{i=1}^{i=n} Ai \cdot fi(\Delta d)$$

When the focussing lens is moved according to the magnitude of movement x determined by the formula (2), instead of the magnitude Δd of focus deviation it is possible to move the focussing lens to its predetermined position at higher precision, as compared with the conventional automatic focussing system.

Next, another embodiment of the present invention which is applied to a variable-power photographic lens system will be described. In case of the mono-focal lens system the reference factor $S_0$ and the constant number A the same values at any time, but in case of the variable-power system they have different values, at the respective zooming positions.

Figure 4:
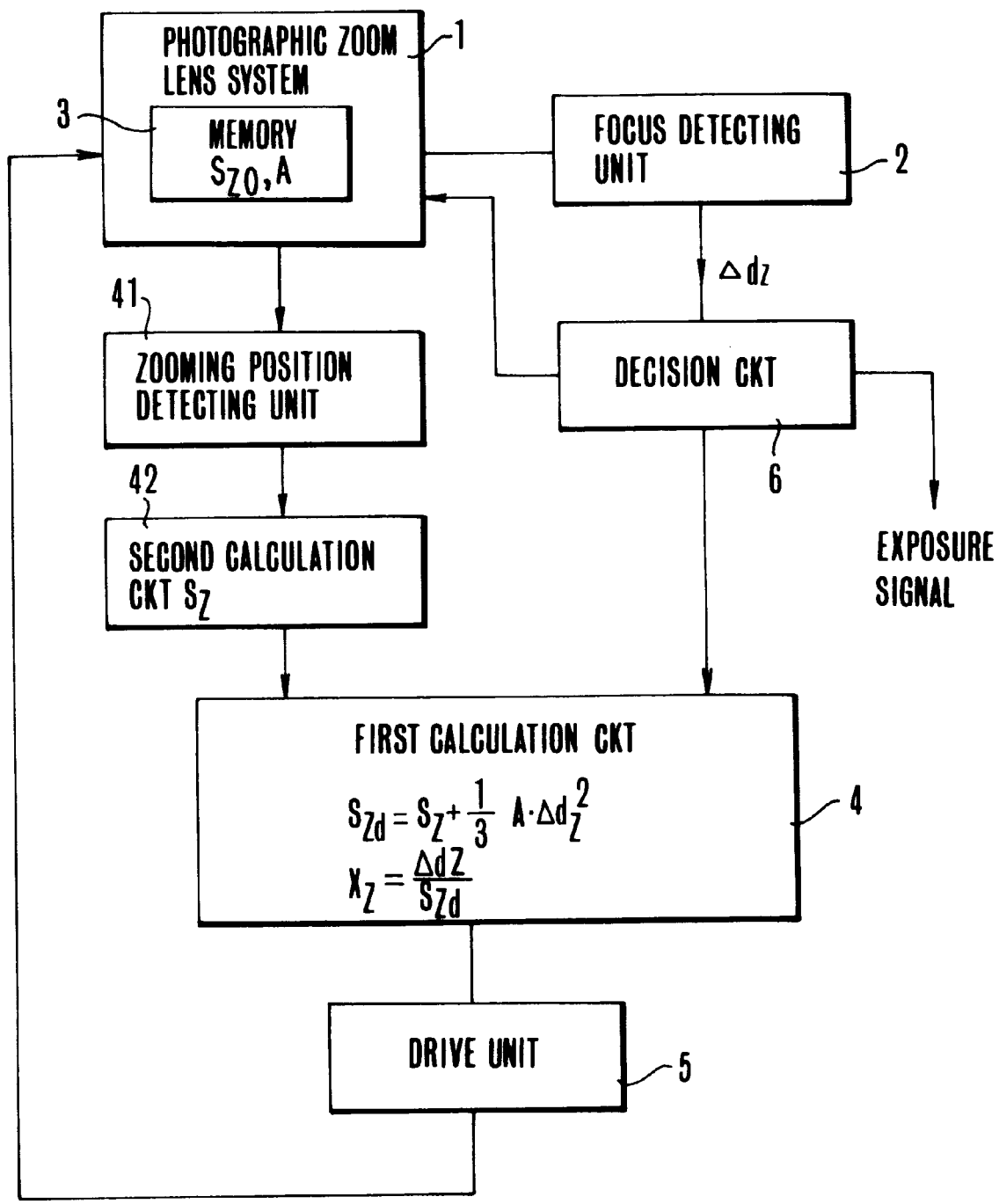
FIG. 4 is a block diagram showing another embodiment of the automatic focussing system according to the present invention.

FIG. 4 is a block diagram which is similar to FIG. 1 but particularly shows the elements peculiar to the variable-power system. In FIG. 4, the same elements as those shown in FIG. 1 are indicated by the same reference numerals. The system as shown in FIG. 4 includes a zooming position detecting unit 41 arranged on the zoom lens system 1 or a camera body to detect the zooming position of the zoom lens system. The zooming area is previously divided into a plurality of sections and said zooming position detecting unit 41 is so constructed as to detect the number of address of the section, counted from any reference point in the zooming area, for example the largest magnification point, at the zooming position of the variable-power system. The system as shown in FIG. 4 further includes a second calculation circuit 42 which is arranged in the photographic lens system 1 or in a part of the first calculation circuit 4 provided in the camera body. This circuit acts to obtain the reference factor $S_Z$ which corresponds to the sensitivity at the respective zooming position. For example, it is assumed that the variable-power system is located at the first zooming position counted from the largest magnification point, which forms the reference point and that the reference sensitivity coefficient, which is the sensitivity concerning the movement of the focussing lens at the largest magnification point, is $S_{Z0}$. Then the reference coefficient at one of the zooming positions $S_Z$ is determined according to the following formula:

$$S_Z = \frac{2 - \frac{1}{n}(I-1)}{2} \times S_{Z0}, \quad (4)$$

where n indicates number of sections of the zooming range.

If $2n = 32$ $$S_Z = \frac{2 - \frac{1}{16}(I-1)}{2} \times S_{Z0}.$$

According to the formula (4), when the variable-power system is located at the largest magnification point, I=1 and $S_Z = S_{Z0}$. Thus $S_Z$ indicates the sensitivity at the largest magnification point.

In the above-described embodiment, if the memory 3 has sufficient storing capacity, it is possible to store the reference coefficients $S_Z$ at the respective zooming positions. In such case, the second calculation circuit 42 is not required.

In FIG. 4, after the reference coefficient $S_Z$ at the zooming position at the time of the focus detection has been decided, the coefficient of movement $S_{Zd}$ of the focussing lens is decided by the first calculation circuit 4, on the basis of the function $f(\Delta d_Z)$ of the magnitude of focus deviation, according to the following formula:

$$S_{Zd} = S_Z + A \cdot f(\Delta d_Z) \tag{5}$$

The magnitude of movement of the focussing lens $x_Z$ is determined according to the following formula:

$$x_Z = \frac{\Delta d_Z}{S_{Zd}} \tag{6}$$

Figure 5A:
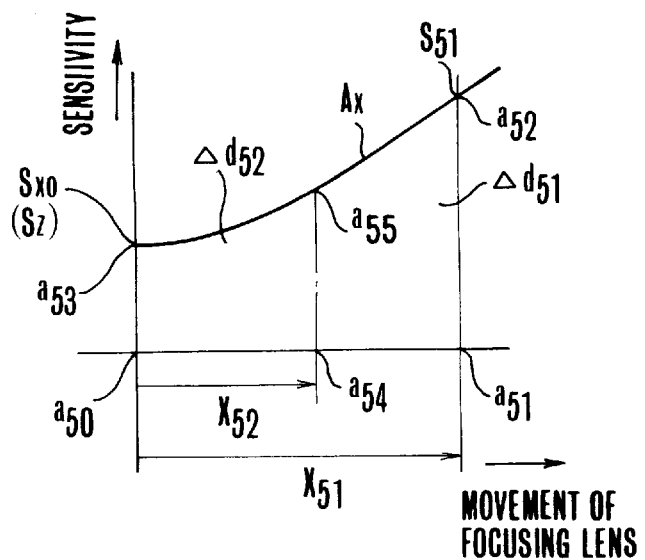
FIGS. 5A, 5B, 5C and 5D are diagrams showing the relations between the magnitude of focus deviation and the magnitude of movement of the focussing lens in the embodiment shown in FIG 4.

In general, when the magnitude of focus deviation of a variable-power lens system is indicated by $\Delta d_{51}$, the magnitude of movement of a focussing lens required is indicated by $x_{51}$, and a reference coefficient corresponding to sensitivity of the focussing lens is indicated by $S_{51}$ the functions of these elements are those as shown in FIG. 5A.

In FIG. 5A, the magnitude of focus deviation $\Delta d_{51}$ is indicated by the area enclosed by the vertical and horizontal axes and the curve Ax, namely enclosed by $a_{50}$, $a_{51}$, $a_{52}$ and $a_{53}$. The magnitude $\Delta d_{51}$ of focus deviation and the magnitude $x_{51}$ of movement of the focussing lens required to attain the focussing hold a non-linear relationship.

In this figure, $S_{X0}$ is a value peculiar to the photographic lens system, which corresponds to the sensitivity around the focussing position of the focussing lens at a predetermined zooming position, predetermined object distance, etc.

$S_Z$ is a sensitivity of the focussing lens in which only the zooming position of the photographing state as detected by the focus detecting unit is taken into consideration. In the most variable-power systems the following approximation is possible, in practice:

$$S_Z \approx S_{X0} \tag{7}$$

Under the circumstances, the explanation will be made, assuming $S_Z \approx S_{X0}$.

$S_{51}$ depends upon the zooming position at the time of focus detection, the object distance, the position of the focussing lens along its optical axis, etc. Assuming that the magnitude of focus deviation as detected by the focus detecting unit is $\Delta d_{52}$, for example, the magnitude of movement required to attain the focussing is $x_{52}$. This $\Delta d_{52}$ corresponds to the area enclosed in $a_{50}$, $a_{54}$, $a_{55}$ and $a_{53}$. Thus it is clear that the magnitude $x_Z$ of movement of the focussing lens required to attain the focussing and the magnitude $\Delta d$ of focus deviation hold non-linear relationship to each other. Accordingly, when the magnitude of movement $x_Z$ is determined on the basis of the magnitude of deviation $\Delta d$, it is important to set up an equation for the curve Ax. However, the equation for the curve Ax widely varies, depending upon the photographing conditions peculiar to each of the photographing systems, as described above, and it is very difficult to easily specify the equation.

Figure 5B:
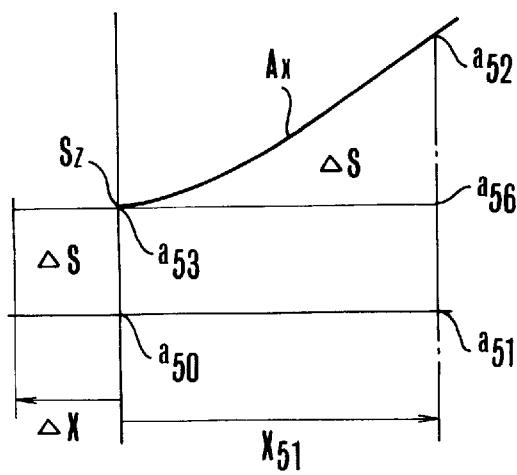

Under such circumstances, the conventional automatic focussing system was so constructed that when the magnitude of deviation was $\Delta d_{51}$, the magnitude of movement $x_Z$ of the focussing lens was determined, using the sensitivity $S_Z$ at the zooming position at the time of the focus detection, according to the formula $x_Z = \Delta d_{51}/S_Z$, as shown in FIG. 5A. However, if the magnitude of movement $x_Z$ was determined according to the formula $x_Z = \Delta d_{51}/S_Z$, as described above, the magnitude of movement $x_Z$ was excessive by the amount $\Delta x = \Delta S/S_Z$, where $\Delta S$ indicates the area enclosed in $a_{53}$, $a_{56}$ and $a_{52}$, as shown in FIG. 5B. As the result, it was required to effect the focus detection again and to repeat the same operation as described above.

Figure 5C:
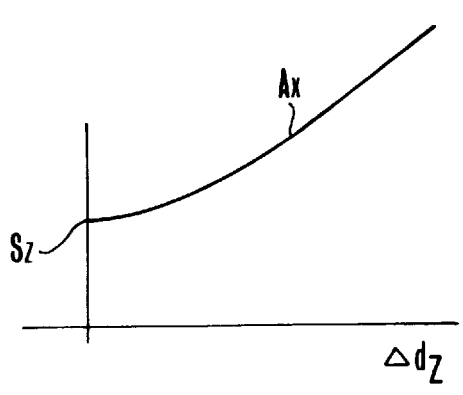

In view of the fact that in the most photographing systems the value $S_{X0}$ on the ordinate in FIG. 5A can be approximated to the sensitivity chiefly based on the zooming position only, according to the embodiment of the present invention the point on the ordinate in FIG. 5A, that is the reference coefficient $S_Z$ is determined, on the basis of the zooming position, according to the formula (4), for example. Upon the study of the various photographing lens systems, it has been found that the curve Ax can be well approximated to a secondary function on the coordinates in which the magnitude of focus deviation $\Delta d_Z$ is indicated on its abscissa, as shown in FIG. 5C and, therefore, the curve Ax is set up according to the following formula:

$$Ax = A \times \Delta d_Z^2 + S_Z \tag{8}$$

where A is a constant. From the value of $\Delta d_{51}$, which corresponds to the area Sz enclosed in $a_{50}$, $a_{51}$, $a_{52}$ and $a_{53}$ in FIG. 5A, the value corresponding to the point on the abscissa at this time, that is the magnitude of movement $x_Z$ of the focussing lens, and the value corresponding to the point on the ordinate, that is the coefficient of movement $S_{Zd}$ corresponding to the sensitivity of the focussing lens are determined according to the following formula:

$$S_{Zd} = S_Z + (Ax - S_Z)/3 \tag{9}$$

From the formulae (8) and (9), the coefficient of movement $S_{Zd}$ is determined according to the following formula:

$$S_{Zd} = S_Z + \tfrac{1}{3} A \cdot \Delta d_{51}^2 \tag{10}$$

The magnitude of movement $x_Z$ of the focussing lens is determined on the basis of the magnitude $\Delta d_{51}$ of focus deviation, according to the following formula:

$$x_Z = \Delta d_{51}/S_{Zd} \tag{11}$$

Figure 5D:
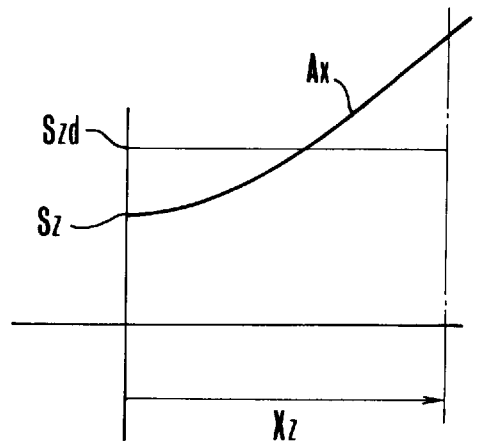

As the result, the area $S_Z$ corresponding to the magnitude of movement of the focussing lens is indicated by the formula $S_Z = S_{Zd} \times x_Z$. As is clear from FIGS. 5A and 5D, the area $S_Z$ and the area of the magnitude $\Delta d_{51}$ of focus deviation as detected by the focus detecting unit are:

$$S_Z \approx \Delta d_{51}$$

From this relation, it is assumed that the magnitude $x_{51}$ of movement which is really required to attain the focussing and the magnitude $x_Z$ of movement as determined by the arithmetic operation are:

$$x_{51} \approx x_Z$$

Accordingly, the embodiment of the present invention as described above enables to move the focussing lens to the predetermined position with high precision by a single movement of the focussing lens.

In this connection it is to be noted that the constant A in the formula (10) is stored in the memory 3 of the photographic lens system 1, for example, at each of the zooming positions and it is read out, with the reference sensitivity $S_{Z0}$ by the zooming position detecting unit.

It will be understood that in the conventional automatic focussing system the magnitude of movement of the focussing lens is determined directly from the values of the magnitude $\Delta d_Z$ of focus deviation and the reference coefficient $S_Z$ corresponding to the sensitivity of the photographic lens system, while in the embodiment of the present invention includes the second calculation circuit and enables effecting precise automatic focussing operation by firstly determining the coefficient of movement $S_{Zd}$ on the basis of the magnitude $\Delta d_Z$ of focus deviation and the reference coefficient $S_Z$ based on the zooming position only, according to the formula (5) or (10), and then determining the magnitude $x_Z$ of movement of the focussing lens, on the basis of the above-mentioned coefficient of movement $S_{Zd}$ and the magnitude $\Delta d_Z$ of focus deviation, by means of the first calculation circuit according to the formula (11).

In this regard it is to be noted that the multinominal expression for determining the coefficient of movement $S_{Zd}$ may be modified to adopt a function other than the secondary function, for example a tertiary or higher-order function, depending upon the chararacteristic property of the photographic lens system.

It is further to be noted that the reference coefficient $S_Z$ in the formula (4) as determined for the variable-power photographic lens system may be determined according to the other formula, depending upon the characteristic property of the photographic lens system.

In the embodiments as explained above, the automatic focussing is effected, while paying attention to the magnitude of focus deviation of focussed position only, regardless of whether the focussed position is located at front side or rear side of the correct focus position. However, if it is taken into consideration whether the focussed position is at front side or rear side of the correct focus position, it will be possible to effect the focus adjustment at higher precision.

Referring to FIGS. 2A and 2B, a variation of position of the image surface caused by a minute movement of the focussing lens along its optical axis, that is the sensitivity of the lens system, depends upon the initial position of the focussing lens, even if the object distance is same. FIG. 2E is a diagram showing the sensitivity S on its ordinate and the position of the focussing lens along its optical axis on its abscissa, in case of a photographic lens of the type in which the lens system is moved as a whole to attain the focussing. In this diagram, $g_1$, $g_2$, $g_3$ . . . indicate the sensitivities at the respective object distances, wherein $g_1$ is the sensitivity regarding an object located at infinite distance and $g_2$, $g_3$ . . . are the sensitivities concerning objects located at progressively nearer positions.

As shown in FIG. 2E, even if the object distance is same, the sensitivity varies, depending upon the initial position of the focussing lens.

In the example as described above, the magnitude of movement of the focussing lens x was determined on the basis of only one coefficient of movement, a constant peculiar to the lens system, in case of the mono-focal lens system, or one coefficient of movement at each zooming position of the lens system, in case of the variable-power lens system. The coefficient of movement Sd was determined as a constant number, and the magnitude of movement x was determined on the basis of such coefficient of movement Sd and the magnitude $\Delta d$ of deviation of focussed position, according to the formula $x=\Delta d/Sd$.

Figure 2D:
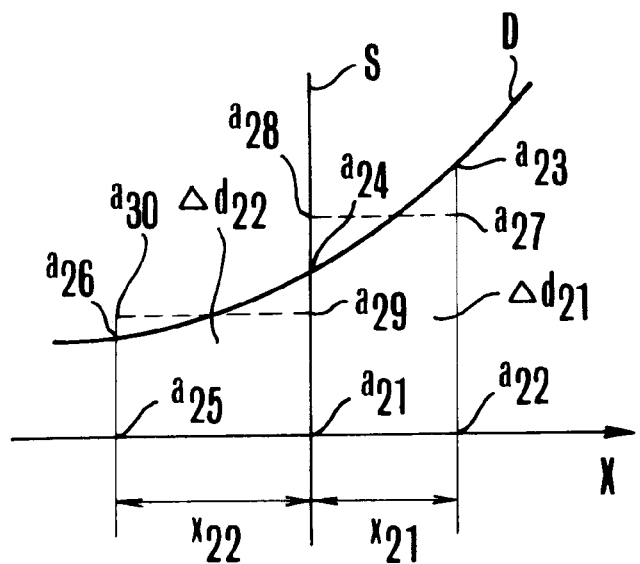
Figure 2E:
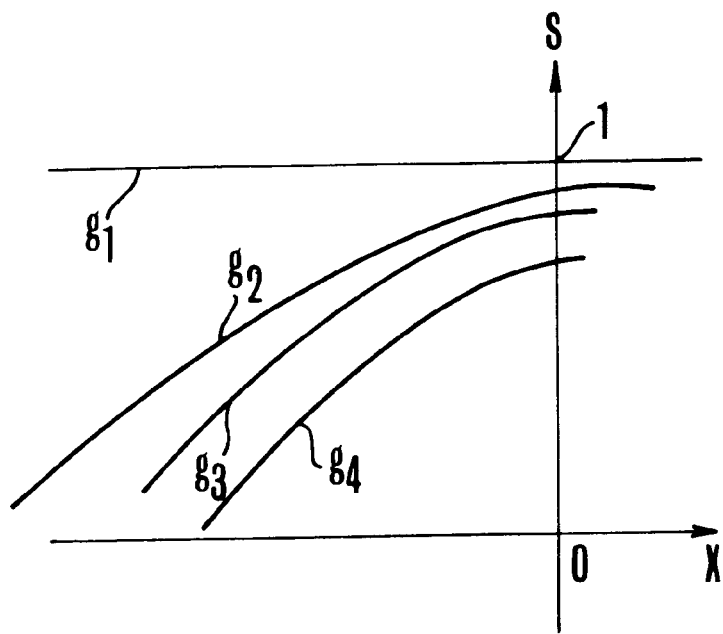

The coefficient of movement Sd corresponds to a constant value on the ordinate in FIG. 2D.

However, even if the magnitude $\Delta d$ of deviation of focussed position is same, the magnitude of movement x of the focussing lens varies, depending upon the photographing condition, as shown in FIG. 2D, owing to the non-linear relationship between them. Particularly, even if the magnitude Ad of deviation of focussed position is same, the magnitude of movement x of the focussing lens varies, depending upon whether the direction of the deviation of focussed position is directed to the object side or the image plane side relative to the predetermined image plane, since the curve D becomes a higher-order function at the right side as compared to the left side as shown in FIG. 2D.

According to the embodiment of the present invention, the direction of deviation is decided and different correction coefficients are applied according to the direction of deviation, whereby more effective coefficients of movement are produced, so that the magnitude of movement of the focussing lens is obtained at higher precision.

FIG. 6 illustrates another embodiment of the present invention, in which the same elements as those shown in FIG. 1A are indicated by the same reference numerals as used in FIG. 1A.

The photographic lens system 1 includes an image producing system of mono-focal type or variable power type, having a focussing lens 11 therein. The focus detecting unit 2 is constructed to detect a magnitude of defocus from a predetermined image plane or a magnitude of deviation of the focussed position corresponding to said magnitude of defocus. The memory 3 is arranged in a lens barrel of the photographic lens system and it stores various factors concerning the optical characteristics of the photographic lens system, such as reference coefficient $S_0$ concerning the movement of the focussing lens, and two correcting coefficients $A_+$, $A_-$, etc. The decision circuit 6 acts to decide the direction of deviation of focussed position of the lens system, namely whether the deviation is at front side or rear side, according to the signal fed from the focus detecting unit 2.

A selecting circuit 7 is included in this device, and said selecting circuit 7 acts to select a predetermined correcting coefficient and a reference coefficient from the memory 3, on the basis of a signal fed from the decision circuit 6. The first calculation circuit 4 acts to produce the coefficient of movement Sd corresponding to the sensitivity, for moving the focussing lens, on the basis of the reference coefficient fed from the memory 3 and selected by the selecting circuit 7 and the magnitude $\Delta d$ of deviation of focussed position as detected by the focus detecting unit 2, thereby producing the magnitude x of movement of the focussing lens required to attain the focussing. The drive unit 5 acts to move the focussing lens by the magnitude determined as the result of the arithmetic operation obtained by the first calculation circuit 4.

In operation of the above-described construction, firstly the magnitude $\Delta d$ of deviation of the focussed position of the photographic lens system is detected by the focus detecting unit 2. If it is decided by the decision circuit 6 that the magnitude $\Delta d$ falls within the allowable range, the exposure is effected. If the magnitude Ad falls outside of the allowable range, the direction of deviation is decided and a signal of decision is fed to the selecting circuit 7. The selecting circuit 7 receives the reference coefficient $S_0$ peculiar to the photographic lens system 1 from the memory 3 and one of the two different values of the correcting coefficients $A_+$ and $A_-$ selected according to the direction of deviation. The selecting circuit 7 feeds the predetermined reference coefficient $S_0$ and the correcting coefficient based on the signal fed from the decision circuit 6 to the first calculation circuit. For example, if the direction of deviation of focussed position is positive, the correcting coefficient $A_+$ is fed to the first calculation circuit, while if said direction is negative, the correcting coefficient $A_-$ is fed to the first calculation circuit.

On the other hand, the focus detecting unit 2 feeds the magnitude $\Delta d$ of deviation to the first calculation circuit 4.

In case of the mono-focal lens system, each of the reference coefficient $S_0$ and the correcting coefficients $A_+$ and $A_-$ has a fixed value.

The first calculation circuit 4 employs the reference coefficient $S_0$, the correcting coefficient $A_+$ or $A_-$, and the magnitude $\Delta d$ of deviation of focussed position, to operate to produce the coefficient of movement Sd for moving the focussing lens, on the basis of the function $f(\Delta d)$ converted from the magnitude $\Delta d$ of deviation of focussed position by means of a converting circuit, using the correcting coefficient $A_+$ in case of the positive direction of deviation of focussed position or the correcting coefficient $A_-$ in case of the negative direction of deviation of focussed position, according to the following formula:

$$Sd = S_0 + A_+ \times f(\Delta d)$$

or $$Sd = S_0 + A_- \times f(\Delta d) \quad (1)'$$

Then the circuit operates to produce the magnitude x of movement of the focussing lens, on the basis of the coefficient of movement Sd obtained according to the above formula (1)' and the magnitude $\Delta d$ of deviation of focussed position, according to the above-mentioned formula (2) $x = \Delta d/Sd$. The drive unit 5 acts to move the focussing lens in accordance with the value of the output of the first arithmetic circuit 4.

According to the above-described embodiment, the magnitude $\Delta d$ of deviation of focussed position is corrected, using the reference coefficient $S_0$ corresponding to the sensitivity of the photographic lens system and the correcting coefficient $A_+$ or $A_-$, and then the magnitude of movement of the focussing lens is decided on the basis of thus corrected magnitude of deviation. For example, the function $f(\Delta d)$ in the formula (1)' is expressed by a quadratic and the coefficient of movement Sd is determined according to the above-mentioned formula (3), that is $Sd = S_0 + A \cdot \Delta d^2$. The magnitude of movement x of the focussing lens is obtained on the basis of the above coefficient of movement Sd and the magnitude $\Delta d$ of deviation of focussed position, according to the formula (2). The reference coefficient $S_0$ in the formula (3) is, for example, the sensitivity of the photographic lens system relating to an object located at the reference distance.

According to the system in which the focussing lens is moved by the magnitude x produced by the formula (2), instead of the magnitude $\Delta d$ of deviation of focussed position, it is possible to move the focussing lens to the predetermined position at higher precision than that of the conventional system.

As seen in FIG. 2D, the sensitivity S varies in simple manner at the front and rear sides of the correct focussed position. This is due to the fact that in a photographic lens system of a front-lens focussing type the focal length of the whole system changes by the focussing operation. In a photographic lens system of the type wherein the focal length of the whole system is decreased by moving the focussing lens toward the object, the sensitivity S is decreased, as compared to the focussed state. In other words, in case of the rear focus in which the defocussing direction is negative and at the side of the object relatively to the focus plane, which corresponds to the case of defocussing to the left side of the ordinate axis S in FIG. 2D, a smaller correcting coefficient $A_-$ is selected and the magnitude of movement x of the focussing lens is determined, using the above correcting coefficient, according to the formulae (1)' and (2). Thus the magnitude of movement $x_{21}$ is obtained at high precision on the basis of the magnitude $\Delta d_{21}$ of deviation of focussed position which corresponds to the area enclosed in $a_{21}$, $a_{22}$, $a_{23}$ and $a_{24}$ in FIG. 2D. In this case, the coefficient of movement Sd corresponds to the distance between $a_{21}$ and $a_{28}$ in FIG. 2D.

It will be understood that the embodiment as explained above is so constructed that the direction of deviation is decided by the decision circuit to determine the correcting coefficient peculiar to the individual photographic lens system and said correcting coefficient is used to obtain the magnitude of movement of the focussing lens at high precision.

The above-described embodiment may be so modified that at the time of connecting the photographic lens system to the camera body, information concerning the reference coefficient and the correcting coefficients peculiar to the lens system are transmitted from the memory of the lens system to the memory provided in the camera body and stored in said memory and such informations is used depending upon signals fed from the decision circuit.

Furthermore, it may be so modified that the selecting circuit is omitted and the photographic lens system receives a signal from the decision circuit arranged in the camera body and, at each time of receiving the signal, sends a corresponding signal from the memory of the lens system directly to the first calculation circuit.

Next, a further embodiment which is applied to the variable-power lens system will be described. In the case where the photographic lens system includes a variable-power system, the values of the above-mentioned reference coefficient and correcting coefficients $A_+$ and $A_-$ depend upon the respective zooming positions, as compared with the mono-focal lens system in which the above-mentioned values are fixed.

Figure 7:
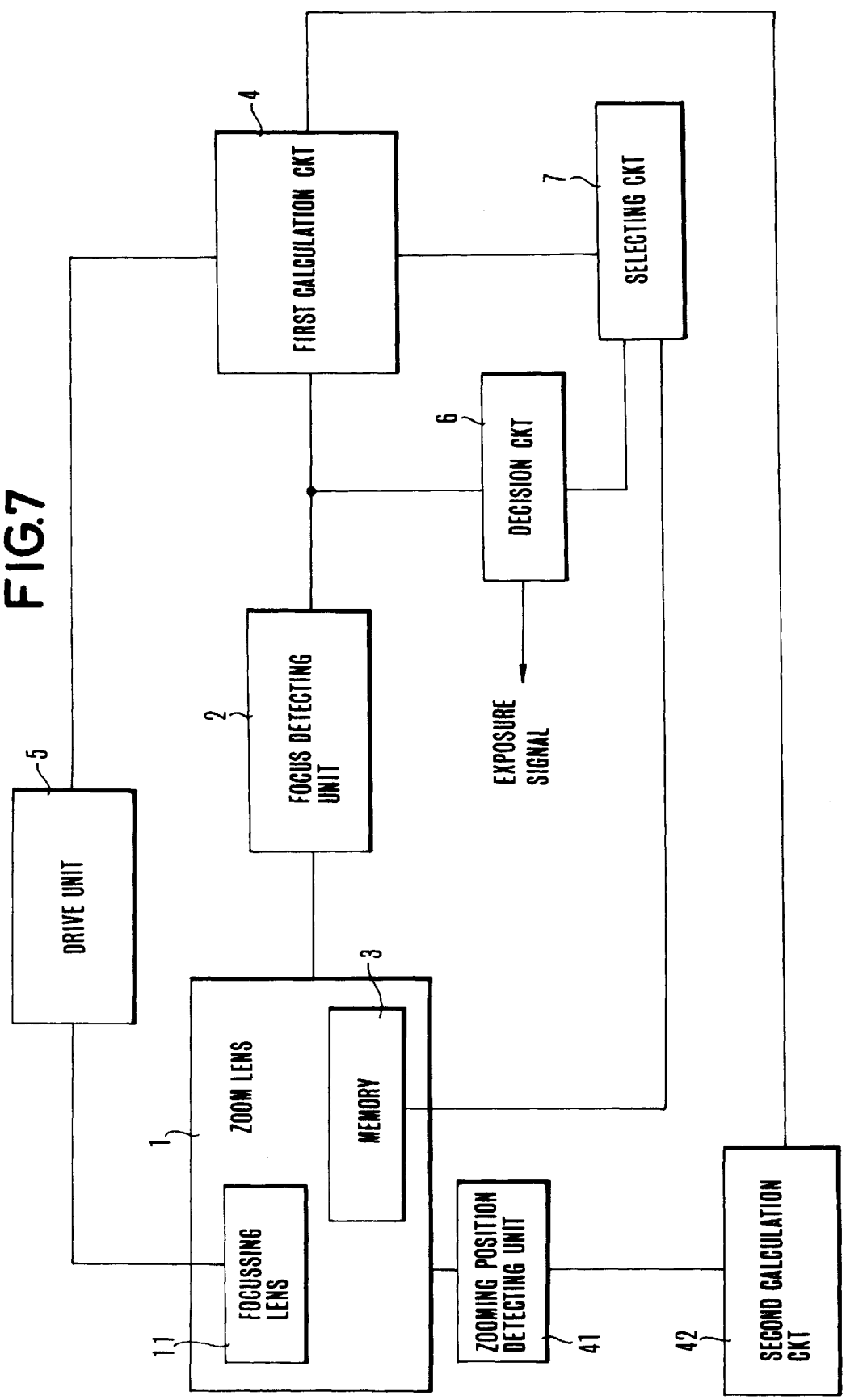

FIG. 7 is a block diagram showing the photographic lens system in which the variable-power system is included in the block diagram of FIG. 6. In FIG. 7, the same elements as those shown in FIG. 6 are indicated by the same reference numerals as used in FIG. 6.

The block diagram shown in FIG. 7 includes a zooming position detecting unit 41 provided in the photographic lens system 1 or the camera body to detect the zooming position of the lens system and a second arithmetic circuit 42.

In the construction as shown in FIG. 7, the reference coefficient $S_Z$ is determined at the zooming position where the focus detection has been effected and then the coefficient of movement $S_Z$ of the focussing lens is determined, on the basis of the function $f(\Delta d_Z)$ converted from the magnitude $\Delta d_Z$ of deviation of focussed position by a converting circuit of the first arithmetic circuit 4, while deciding the direction of deviation by the decision circuit, in the same manner as described above, by the calculation circuit and using the correcting coefficient $A_{Z+}$ or $A_{Z-}$ depending upon the decided direction of deviation, according to the following formula:

$$\left.\begin{array}{l} S_{Zd} = S_Z + A_{Z+} \cdot f(\Delta d_Z) \\ \text{or} \\ S_{Zd} = S_Z + A_{Z-} \cdot f(\Delta d_Z) \end{array}\right\} \quad (5)'$$

The magnitude $x_Z$ of movement of the focussing lens is determined according to the above-mentioned formula (6), that is:

$$x_Z = \frac{\Delta d_Z}{S_{Zd}}$$

It will be understood that according to this embodiment either one of different constants, the correcting coefficients $A_+$ or $A_-$, is adopted depending upon the direction of deviation of focussed position, in view of the fact that the curve D forms different shapes according to the direction of deviation, as shown in FIG. 2D. Thus, the magnitude of movement of the focussing lens is determined at higher precision. Furthermore, according to this embodiment there is provided the second arithmetic circuit whereby firstly the coefficient of movement $S_{Zd}$ is determined, on the basis of the magnitude $\Delta d_Z$ of deviation of focussed position, the reference coefficient $S_Z$ based on the zooming position only and the correcting coefficients $A_{Z+}$ and $A_{Z-}$, according to the formula (5)' or (10) and then the magnitude $x_Z$ of movement of the focussing lens is determined, on the basis of said coefficient of movement $S_{Zd}$ and the magnitude $\Delta dz$ of deviation of focussed position, by the first calculation circuit according to the formula (11). The system according to this embodiment can attain the automatic focussing at higher precision than the conventional system in which the magnitude of movement of the focussing lens is determined directly on the basis of the magnitude $\Delta dz$ of deviation of focussed position and the reference coefficient $S_Z$ corresponding to the sensitivity of the photographic lens system.

Figure 8:
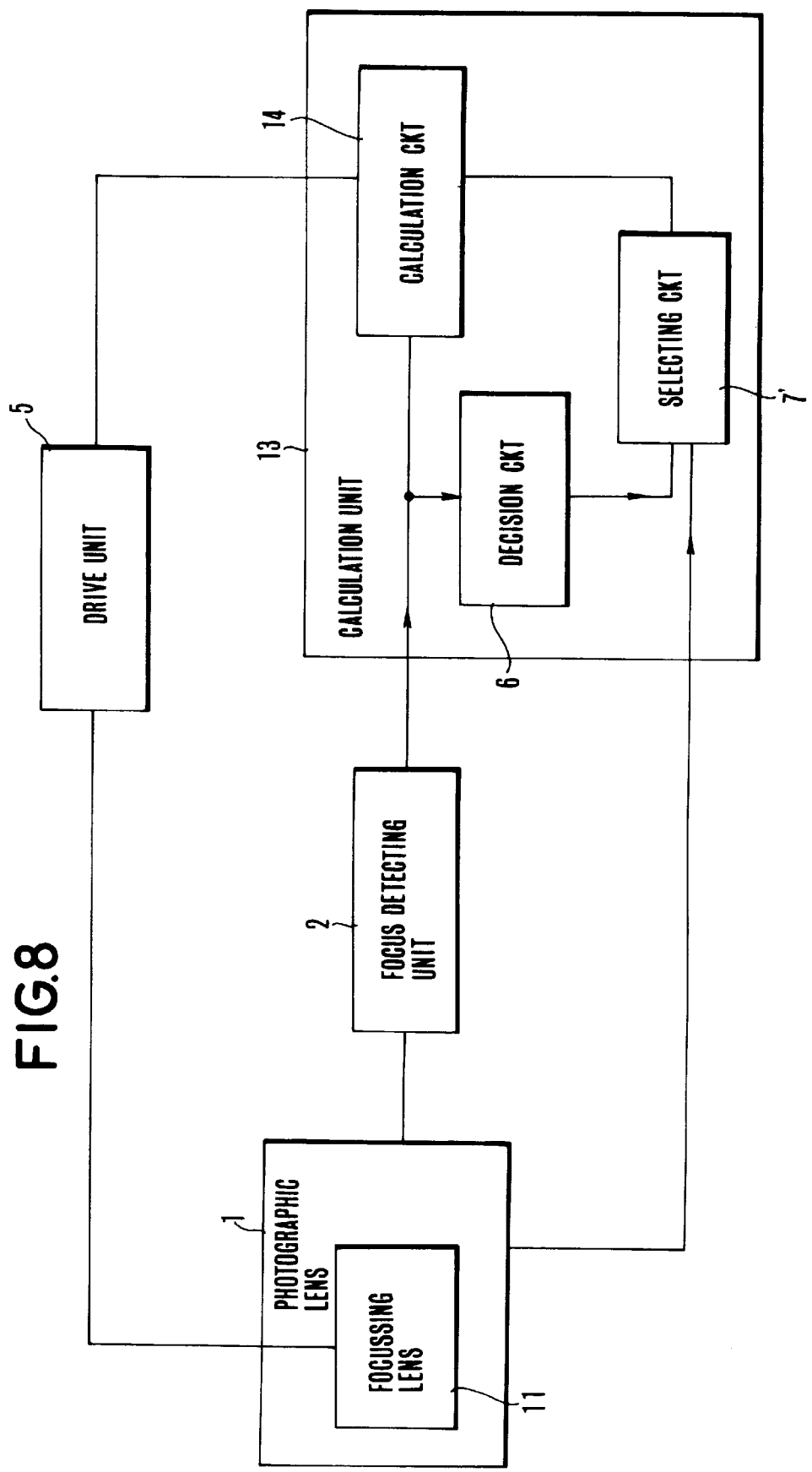

FIG. 8 illustrates another embodiment of the present invention. In this embodiment, the change of the sensitivity depending upon the direction of deviation of focussed position is taken into consideration. In FIG. 8, the same elements as those shown in the above embodiment are indicated by the same reference numerals. Elements newly added in FIG. 8 are as follows.

In FIG. 8, 13 indicates a calculation circuit for determining the magnitude of movement of the focussing lens 11, according to the output signal fed from the focus detecting unit 2. The calculation circuit 13 includes a decision circuit 6 for receiving a signal from the focus detecting unit 2 and deciding the direction of direction of focussed position, namely front side or rear side, a selecting circuit 7' for selecting a predetermined characteristic signal from a plurality of characteristic signals corresponding to the sensitivity of the photographic lens system in accordance with a signal fed from the decision circuit 6 and a calculation circuit 14 for determining the magnitude of movement of the focussing lens 11, utilizing the output signal fed from the focus detecting unit 2 and the characteristic signal fed from the selecting circuit 7'. 5 is a drive unit for driving the focussing lens by a predetermined magnitude in accordance with the result determined by the arithmetic circuit 13.

As seen in FIG. 2D, the sensitivity S varies in simple manner at the front and rear sides of the focussed position. This is due to the fact that in the photographic lens system of front-lens focussing type the focal length of the whole system makes a small variation at the time of focussing. In the photographic lens system in which the focal length of the whole system is decreased when the focussing lens is moved toward the object, the sensitivity S is decreased as compared with the focussed time.

In the case where the defocussing direction is directed toward the object relatively to the image plane, that is, rear focus, which corresponds to the defocussing state to the left side in FIG. 2D, the coefficient of movement $S_{dS}$ smaller than that of the reference photographic lens system is selected by the selecting circuit and the magnitude $S_{dS}$ of movement of the focussing lens is determined by the arithmetic circuit, on the basis of the above coefficient of movement, according to the following formula:

$$X_S = \Delta d / S_{dS}$$

Thus, the magnitude of movement $x_{22}$ is determined at high precision, from the magnitude $\Delta d_{22}$ of the deviation of the focussed position corresponding to the area enclosed in $a_{21}$, $a_{25}$, $a_{26}$ and $a_{24}$.

On the other hand, in the photographic lens system in which the focal length of the whole system is decreased when the focussing lens is moved toward the image plane, the sensitivity S is increased as compared with the focussed time.

This case corresponds to the defocussing state to the right side in FIG. 2D, and accordingly the coefficient of movement $S_{d1}$ larger than the reference coefficient of movement is selected and the magnitude $x_1$ of the focussing lens is determined by the calculation circuit, according to the following formula:

$$x_1 = \Delta d / S_{d1}$$

Thus the magnitude $\Delta d_{21}$ of deviation of focussed position is determined.

It will be understood that in accordance with this embodiment the direction of deviation is decided and then the magnitude of movement of the focussing lens is determined at high precision, by using the coefficient of movement peculiar to the individual photographic lens system which corresponds to the direction of deviation.

What is claimed is:

1. An automatic focussing system comprising:
   an objective lens having a focussing lens unit;
   focus detecting means for detecting focus deviation of said objective lens;
   memory means for storing focus correction data based on focussing characteristics of said objective lens, said focus correction data including a reference value and a factor related to a magnitude of focus deviation;
   first operation means for calculating a coefficient of movement in accordance with said focus correction data and a non-linear function of the focus deviation detected by said focus detecting means for a magnitude of focus adjustment;
   second operation means for determining a magnitude of focus adjustment in accordance with said coefficient of movement and said detected focus deviation, wherein said magnitude of focus adjustment is effective to reduce focus deviation to within a predetermined limit irrespective of said detected focus deviation; and
   drive means for driving said focussing lens unit in accordance with the determined magnitude of focus adjustment.

2. An automatic focussing system according to claim 1, in which said objective lens is a mono-focal lens.

3. An automatic focussing system according to claim 1, wherein said objective lens is a variable-power lens system, and wherein said focus correction data stored in said memory means includes data formed by dividing a variable-power range of said variable-power lens system into a plurality of sections.

4. An automatic focussing system according to claim 1, wherein said focus detecting means is constructed to detect direction as well as magnitude of the deviation of the focussed position, and said focus correction data stored in said memory means includes data corresponding to the direction of deviation of the focussed position.

5. An automatic focussing system comprising:
- an objective lens including memory means for storing focus correction data based on focussing characteristics of said objective lens, said focus correction data including a reference value and a plurality of factors related to a magnitude and direction of focus deviation;
- focus detecting means for detecting magnitude and direction of deviation from a focussed position of said objective lens;
- first operation means for determining a coefficient of movement in accordance with said focus correction data and a magnitude and direction of focus deviation detected by said focus detecting means;
- second operation means for determining a magnitude of movement for said objective lens required to attain focussing of said objective lens in accordance with said coefficient of movement and said detected magnitude of focus deviation; and
- drive means for driving said objective lens in accordance with said magnitude of movement.

6. An automatic focussing system according to claim 5, wherein said focussing correction data includes a reference coefficient $S_0$ and two kinds of factors $A_+$ and $A_-$.

7. An automatic focussing system according to claim 6, wherein said first operation means determines the coefficient of movement Sd by one of the following formulae:

$$Sd=S_0+A_+\cdot f(\Delta d)$$

$$Sd=S_0+A_-\cdot f(\Delta d)$$

and wherein said second operation means determine the magnitude of movement x by a formula as follows:

wherein x is the magnitude of movement of the objective lens and $\Delta d$ is the magnitude of deviation.

8. An automatic focussing system according to claim 5, wherein said objective lens is a variable-power lens system, and said automatic focussing system further comprises means for detecting a power of said lens system, and wherein said first operation means determines the coefficient of movement in accordance with said power, said focus correction data and said detected magnitude and direction of focus deviation.

9. An automatic focussing system according to claim 8, further comprising means for moving said objective lens as a whole.

10. An automatic focussing system according to claim 5, in which said objective lens comprises a focusing lens unit.

11. An objective lens device attachable to a camera body having (1) focus detecting means for detecting a magnitude of deviation of the image plane of an objective lens using a light beam passing through the objective lens device, and (2) operation means for determining a magnitude of a lens drive amount on the basis of focus correction data sent from said objective lens and a non-linear function of the magnitude of the image plane deviation, comprising:
- an objective lens;
- means for storing said focus correction data based on focussing characteristics of said objective lens, said focus correction data including a reference value and a factor related to the magnitude of the image plane deviation; and
- optical means driven in accordance with the magnitude of the lens drive amount determined in accordance with the non-linear function of the detected magnitude of image plane deviation,
- wherein said operation means utilizes (1) focus correction data stored in said means for storing, and (2) a non-linear function of the detected magnitude of image plane deviation for a magnitude of focus adjustment to calculate a coefficient of movement, said operation means utilizing the calculated coefficient of movement and the detected magnitude of image plane deviation to determine said magnitude of lens drive amount, the determined magnitude of lens drive amount being effective to reduce focus deviation to within a predetermined limit irrespective of the detected magnitude of focus deviation.

12. An automatic focussing system, comprising:
- a mono-focal objective lens having a focussing lens unit;
- focus detecting means for detecting focus deviation of said objective lens;
- memory means for storing focus correction data based on focussing characteristics of said objective lens, said focus correction data including a reference value and a factor related to a magnitude of focus deviation;
- operating means for calculating coefficient of movement in accordance with said focus correction data and a non-linear function of the focus deviation detected by said focus detecting means for a magnitude of focus adjustment, and for determining a magnitude of focus adjustment in accordance with said coefficient of movement and said detected focus deviation, wherein the calculated magnitude of focus adjustment is effective to reduce focus deviation to within a predetermined limit irrespective of said detected focus deviation; and
- drive means for driving said focussing lens unit in accordance with said magnitude of focus adjustment.

13. An automatic focussing system, comprising:
- a variable-power objective lens system having a focussing unit;
- focus detecting means for detecting focus deviation of said objective lens system;
- memory means for storing focus correction data based on focussing characteristics of said objective lens system, said focus correction data including a reference value and a factor related to a magnitude of focus deviation;
- operating means for calculating a coefficient of movement in accordance with said focus correction data and a focus deviation detected by said focus detecting means and for determining a magnitude of focus adjustment in accordance with said coefficient of movement and said detected focus deviation, wherein said magnitude of focus adjustment is effective to reduce focus deviation to within a predetermined limit irrespective of said focus deviation;
- drive means for driving said focussing lens unit in accordance with said magnitude of focus adjustment; and
- means for detecting a power of said variable-power objective lens system wherein said operating means determines said coefficient of movement in accordance with said power, said focus correction data and said detected focus deviation.

14. A camera body comprising:
- focus detecting means for detecting a magnitude of focus deviation of a detachable and focus-adjustable objective lens device by receiving a light beam passing through the objective lens device; and
- operation means for determining a magnitude of focus adjustment on the basis of focus correction data sent from the objective lens device and a non-linear function of the magnitude of the focus deviation for a magnitude of focus adjustment, said focus correction data including a reference value and a factor related to the magnitude of focus deviation, said operation means determining the magnitude of focus adjustment by using the magnitude of focus deviation, the reference value, and the factor related to the magnitude of focus deviation.

15. An objective lens attachable to a camera body having (1) focus detecting means for detecting an image plane deviation of said objective lens, and (2) operating means for (a) calculating a coefficient of movement in accordance with focus correction data sent from said objective lens and a non-linear function of the image plane deviation detected by said focus detecting means, and (b) determining a magnitude of lens movement in accordance with said coefficient of movement and said detected image plane deviation, comprising:

a mono-focal objective lens having a focussing lens unit;

memory means for storing focus correction data based on focussing characteristics of said objective lens, said focus correction data including a reference value and a factor related to a magnitude of image plane deviation;

drive means for driving said focussing lens unit in accordance with said magnitude of lens movement calculated in accordance with the non-linear function of the detected image plane deviation for a magnitude of focus adjustment; and wherein said magnitude of focus adjustment determined by said operating means is effective to reduce focus deviation to within a predetermined limit irrespective of said detected focus deviation.

16. An automatic focussing system comprising:

an objective of lens having a focussing lens unit, said objective of lens being a variable-power lens system;

focus detecting means for detecting a focus deviation of said objective lens;

memory means for storing focus correction data based on focussing characteristics of said objective lens, said focus correction data including a reference value and a factor related to a magnitude of focus deviation;

first operation means for calculating a coefficient of movement in accordance with said focus correction data and a focus deviation detected by said focus detecting means;

second operation means for determining a magnitude of focus adjustment in accordance with said coefficient of movement and said detected focus deviation, wherein said magnitude of focus adjustment is effective to reduce focus deviation to within a predetermined limit irrespective of said detected focus deviation;

drive means for driving said focussing lens unit in accordance with said magnitude of focus adjustment;

means for detecting a power of said lens system, wherein said first operation means determines said coefficient of movement in accordance with said power, said focus correction data, and said detected focus deviation.

17. A camera comprising:

(a) a photographing lens for forming an image of an object, said photographing lens having at least one lens component which is movable to form the image of the object;

(b) detecting means for detecting an amount of defocus of the image of the object formed by said photographing lens from a predetermined plane and for producing a defocus signal which indicates the detected amount of defocus;

(c) memory means in which a conversion coefficient and a correction coefficient are stored fixedly;

(d) calculating means for determining a corrected conversion coefficient on the basis of the conversion coefficient stored in said memory means and both said detected amount of defocus conforming to said defocus signal and said correction coefficient stored in said memory means, and also for conducting a calculation of a driving amount on the basis of the corrected conversion coefficient and the detected amount of defocus; and (e) lens driving means operative in accordance with the driving amount calculated by said calculating means, for driving said lens.

18. A camera comprising:

(a) a photographing lens for forming an image of an object, said photographing lens having at least one lens component which is movable to form the image of the object;

(b) detecting means for detecting an amount of defocus of the image of the object formed by said photographing lens from a predetermined plane and for producing a defocus signal which indicates the detected amount of defocus;

(c) memory means in which a reference coefficient and a constant number are stored fixedly;

(d) calculating means for determining a coefficient of movement on the basis of the reference factor stored in said memory means and both said detected amount of defocus conforming to said defocus signal and said constant number stored in said memory means, and also for conducting a calculation of a driving amount on the basis of the coefficient of movement and the detected amount of defocus; and (e) lens driving means operative in accordance with the driving amount calculated by said calculating means, for driving said lens.

19. A camera comprising:

(a) a photographing lens for forming an image of an object, said photographing lens having at least one lens component which is movable to form the image of the object;

(b) detecting means for detecting an amount of defocus of the image of the object formed by said photographing lens from a predetermined plane and for producing a defocus signal which indicates the detected amount of defocus;

(c) memory means in which a conversion coefficient and a correction coefficient are stored fixedly;

(d) motor means for moving said at least one lens component;

(e) calculating means for determining a corrected conversion coefficient on the basis of the conversion coefficient stored in said memory means and both said detected amount of defocus conforming to said defocus signal and said correction coefficient stored in said memory means, and also for conducting a calculation of a driving amount of said motor means on the basis of the corrected conversion coefficient and the detected amount of defocus, said calculating means producing a driving signal which indicates said driving amount of said motor means; and (f) control means responsive to said driving signal for causing said motor means to drive by said driving amount indicated by said driving signal.

20. A camera according to one of claim 17 or claim 18, wherein said calculating means determines the corrected conversion coefficient in accordance with the following formula:

$$Sd = S_0 + Af(\Delta d)$$

where $S_0$ is said conversion coefficient, A is said correction coefficient, $f(\Delta d)$ is a function of said detected amount of defocus, and Sd is said corrected conversion coefficient.

21. A camera according to claim 20, wherein said calculating means conducts the calculation converting said detected amount of defocus into said driving amount in accordance with the following formula:

$$x = \Delta d / Sd$$

where x is said driving amount.

22. A camera according to claim 21, wherein said conversion coefficient is determined to be the limit of the ratio of the detected amount of defocus to the driving amount, as the driving amount approaches zero.

23. A camera according to claim 19, wherein said calculating means conducts the calculation converting said detected amount of defocus into said driving amount in accordance with the following formula:

$$x = \Delta d / Sd$$

where x is said driving amount, Sd is said corrected conversion coefficient and $\Delta d$ is said detected amount of defocus.

24. A camera according to claims 19, wherein said calculating means determines the corrected conversion coefficient in accordance with a formula that depends on both the magnitude and the sign of the detected amount of defocus.

25. A camera according to claim 19, wherein said calculating means determines the corrected conversion coefficient in accordance with a formula having a first order term of the detected amount of defocus.

26. A camera according to claim 19, wherein said calculating means determines the corrected conversion coefficient in accordance with a formula having a first order term of the detected amount of defocus and that depends on both the magnitude and the sign of the detected amount of defocus.

27. A camera comprising:
(a) a photographing lens for forming an image of an object, said photographing lens having at least one lens component which is movable to form the image of the object;
(b) detecting means for detecting an amount of defocus of the image of the object formed by said photographing lens from a predetermined plane and for producing a defocus signal which indicates said detected amount of defocus;
(c) memory means in which a conversion coefficient and a correction coefficient are stored fixedly, said conversion coefficient having one value and said correction coefficient having a plurality of values;
(d) motor means for moving said at least one lens component;
(e) calculating means for determining a corrected conversion coefficient on the basis of the value of said conversion coefficient stored in said memory means and both the detected amount of defocus conforming to said defocus signal and one of said plurality of values of said correction coefficient stored in said memory means, and also for conducting a calculation of a driving amount of said motor means on the basis of the corrected conversion coefficient and the detected amount of defocus, said calculating means producing a driving signal which indicates said driving amount of said motor means; and
(f) control means responsive to said driving signal for causing said motor means to drive by said driving amount indicated by said driving signal.

28. A camera according to claim 27, wherein said calculating means is adapted for determining the corrected conversion coefficient Sd from said defocus amount, said conversion coefficient, and said plurality of correction coefficient values in accordance with a multi-nominal expression of a secondary, tertiary, or higher order function.

29. A camera according to claim 28, wherein said calculating means conducts the calculation said detected amount of defocus into said driving amount in accordance with the following formula:

$$x = \Delta d / Sd$$

where x is said driving amount.

30. A camera according to claim 27, wherein said calculating means determines the corrected conversion coefficient in accordance with a formula that depends on both the magnitude and the sign of the detected amount of defocus.

31. A camera according to claim 27, wherein said calculating means determines the corrected conversion coefficient in accordance with a formula having a first order term of the detected amount of defocus.

32. A camera according to claim 27, wherein said calculating means determines the corrected conversion coefficient in accordance with a formula having a first order term of the detected amount of defocus and that depends on both the magnitude and the sign of the detected amount of defocus.

33. A photographing lens adapted to be mounted on a camera body and having detecting means for detecting an amount of defocus of the image of the object from a predetermined plane, calculation means for conducting a calculation in accordance with an output from said detecting means, and lens driving means operative in accordance with the result of the calculation conducted by said calculation means, said photographing lens comprising:
(a) an optical system for forming an image of an object, said optical system having at least one lens component which is movable to form the image of the object; and
(b) memory means in which at least one conversion coefficient and at least one correction coefficient are stored fixedly,
said calculation means determining a corrected conversion coefficient on the basis of a conversion coefficient stored in said memory means and both the detected amount of defocus and a correction coefficient stored in said memory means, and also conducting a calculation of a driving amount of said lens driving means on the basis of the corrected conversion coefficient and the detected amount of defocus.

34. A photographing lens according to claim 33, wherein said calculation means determines the corrected conversion coefficient in accordance with a formula that depends on both the magnitude and the sign of the detected amount of defocus.

35. A photographing lens according to claim 33, wherein said calculation means determines the corrected conversion coefficient in accordance with a formula having a first order term of the detected amount of defocus.

36. A photographing lens according to claim 33, wherein said calculation means determines the corrected conversion coefficient in accordance with a formula having a first order term of the detected amount of defocus and that depends on both the magnitude and the sign of the detected amount of defocus.

37. A camera comprising:
  (a) a photographing lens for forming an image of an object, said photographing lens having at least one lens component which is movable to form the image of the object, the optical characteristics of said photographing lens being variable;
  (b) first detecting means for detecting an amount of defocus of the image of the object formed by said photographing lens from a predetermined plane and for producing a defocus signal which indicates the detected amount of defocus;
  (c) memory means in which a conversion coefficient and a correction coefficient are stored fixedly, said conversion coefficient having a plurality of values and said correction coefficient having a plurality of values;
  (d) second detecting means for detecting a change in the optical characteristics of said photographing lens and for producing an optical detection signal;
  (e) selecting means for selecting one of said plurality values of said conversion coefficient and one of said plurality values of said correction coefficient in response to said optical detection signal;
  (f) motor means for moving said at least one lens component;
  (g) calculating means for correcting the selected one of said plurality of values of said conversion coefficient on the basis of the detected amount of defocus conforming to said defocus signal and the selected one of said plurality of values of said correction coefficient, and for conducting a calculation for converting said detected amount of defocus into a driving amount of said motor means on the basis of the corrected one of said plurality of values of said conversion coefficient, said calculating means producing a driving signal which indicates said driving amount of said motor means; and
  (h) control means responsive to said driving signal for causing said motor means to drive by said driving amount indicated by said driving signal.

38. A camera according to claim 32, wherein the plurality of conversion coefficient values is equal in number to the plurality of correction coefficient values.

39. A camera according to claim 33, wherein said calculating means is adapted for determining the corrected conversion coefficient Sd from said defocus amount Δd, one of the plurality of said conversion coefficients $S_0$, and one of the plurality of correction coefficients A in accordance with a formula including a constant term equal to $S_0$ and at least a first order term of said defocus amount Δd.

40. A camera according to claim 34, wherein said lens has a construction capable of changing its power arrangement, said camera further comprising means for selecting one of a plurality of combinations of said conversion coefficients and said correction coefficients in accordance with a change in said power arrangement.

41. A camera according to claim 34, wherein said lens has a construction capable of changing its focal distance, said camera further comprising means for selecting one of a plurality of combinations of said conversion coefficients and said correction coefficients in accordance with a change in said focal distance.

42. A camera according to claim 36, wherein said photographing lens is of the type having a variable focal distance and said second detecting means is an encoder responsive to the change in the focal distance of said photographing lens.

43. A camera according to claim 36, wherein said photographing lens is capable of focussing on a near object, and wherein said conversion coefficient and said correction coefficient are related to the distance to the object, and wherein said second detecting means is an encoder responsive to an operation of said photographing lens.

44. A camera according to claim 37, wherein said calculating means corrects the selected one of said plurality of values of said conversion coefficient in accordance with a formula that depends on both the magnitude and the sign of the detected amount of defocus.

45. A camera according to claim 37, wherein said calculating means corrects the selected one of said plurality of values of said conversion coefficient in accordance with a formula having a first order term of the detected amount of defocus.

46. A camera according to claim 37, wherein said calculating means corrects the selected one of said plurality of values of said conversion coefficient in accordance with a formula having a first order term of the detected amount of defocus and that depends on both the magnitude and the sign of the detected amount of defocus.

47. A camera comprising:
  (a) a photographing lens for forming an image of an object, said photographing lens having at least one lens component which is movable to form the image of the object;
  (b) detecting means for detecting an amount of defocus of the image of the object formed by said photographing lens from a predetermined plane and for producing a defocus signal which indicates the detected amount of the focus;
  (c) memory means in which a plurality of coefficients are stored fixedly, said coefficients including a conversion coefficient and two correction coefficients;
  (d) motor means for moving said at least one lens component;
  (e) calculating means responsive to said detected amount of defocus and said plurality of coefficients stored in said memory means for calculating a driving amount of said motor means so that the calculated driving amount changes non-linearly with respect to the detected amount of defocus, said calculating means producing a driving signal which indicates said driving amount of said motor means, wherein said calculating means determines a corrected conversion coefficient in accordance with a formula that depends on the detected amount of defocus and on the conversion coefficient stored in said memory means and both of the two correction coefficients stored in said memory means and conducts a calculation of said driving amount of said motor means on the basis of the corrected conversion coefficient and the detected amount of defocus; and
  (f) control means responsive to said driving signal for causing said motor means to drive by said driving amount indicated by said driving signal.

48. A camera according to claims 47, wherein the calculating means determines the corrected conversion coefficient in accordance with a formula having a first order term of the detected amount of defocus and a higher order term of the detected amount of defocus, said first order term including one of said two correction coefficients and said higher order term including the other of said two correction coefficients.

49. A camera comprising:

(a) a photographing lens for forming an image of an object, said photographing lens having at least one lens component which is movable to form the image of the object;

(b) detecting means for detecting an amount of defocus of the image of the object formed by said photographing lens from a predetermined plane and for producing a defocus signal which indicates the detected amount of defocus;

(c) memory means in which a conversion coefficient and a correction coefficients are stored fixedly;

(d) calculating means for determining a corrected conversion coefficient on the basis of a polynomial formula which includes the conversion coefficient stored in said memory means and both said detected amount of defocus conforming to said defocus signal and said correction coefficient stored in said memory means, and also for conducting a calculation of a driving amount on the basis of the corrected conversion coefficient and the detected amount of defocus; and (e) lens driving means operative in accordance with the driving amount calculated by said calculating means, for driving said lens.

50. A photographing lens adapted to be mounted on a camera body and having detecting means for detecting an amount of defocus of the image of the object from a predetermined plane, calculation means for conducting a calculation in accordance with an output from said detecting means, and lens driving means operative in accordance with the result of the calculation conducted by said calculation means, said photographing lens comprising:

(a) an optical system for forming an image of an object, said optical system having at least one lens component which is movable to form the image of the object; and (b) memory means in which at least one conversion coefficient and at least one correction coefficients are stored fixedly, (c) said calculation means determining a corrected conversion coefficient on the basis of a polynomial formula which includes a conversion coefficient stored in said memory means and both the detected amount of defocus and a correction coefficient stored in said memory means, and also conducting a calculation of a driving amount of said lens driving means on the basis of the corrected conversion coefficient and the detected amount of defocus.

* * * * *

UNITED STATES PATENT AND TRADEMARK OFFICE
CERTIFICATE OF CORRECTION

PATENT NO.    : 6,208,811 B1
DATED         : March 27, 2001
INVENTOR(S)   : Tsunefumi Tanaka It is certified that error appears in the above-identified patent and that said Letters Patent is hereby corrected as shown below:

Column 4,
Line 6, "factor sensitivity of the lens" should read -- factor (or a so-called "conversion coefficient") --;
Line 7, "system," should be deleted; and
Line 60, "Δd of deviation of focussed position" should read -- (or a so-called "corrected conversion coefficient") --.

Column 5,
Line 13, "body, information concerning" should read -- (or a so-called "corrected conversion coefficient") --.

Column 9,
Line 3, "in" should be deleted.

Column 10,
Line 1, "Ad" should read -- Δd --; and
Line 54, "Ad" should read -- Δd --.

Column 11,
Lines 18-22 should read,
$$\left. \begin{array}{l} Sd = S_o + A_+ x f(\Delta d) \\ \text{or} \\ Sd = S_o + A_- x f(\Delta d) \end{array} \right\} \ldots (1)'$$

Column 12,
Line 22, "informations" should read -- information --.

Column 13,
Line 41, "of direction" should be deleted.

Column 14,
Line 24, "deviation of" should read -- the deviation of the --.

Column 15,
Line 35, "follows:" should read -- follows: $x = \Delta d / Sd$ --.

Column 19,
Line 1, "claim 18," should read -- claim 19, --; and

UNITED STATES PATENT AND TRADEMARK OFFICE
CERTIFICATE OF CORRECTION

PATENT NO. : 6,208,811 B1
DATED : March 27, 2001
INVENTOR(S) : Tsunefumi Tanaka

It is certified that error appears in the above-identified patent and that said Letters Patent is hereby corrected as shown below:

<u>Column 21,</u>
Line 43, "claim 32," should read -- claim 37, --.
Line 47, "claim 33," should read -- claim 37, --.

Signed and Sealed this

Fourth Day of June, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.     : 6,208,811 B1
DATED          : March 27, 2001
INVENTOR(S)    : Tsunefumi Tanaka It is certified that error appears in the above-identified patent and that said Letters Patent is hereby corrected as shown below:

Column 17,
Line 33, "of" should be deleted; and
Line 34, "of" should be deleted.

Column 19,
Line 31, "claims" should read -- claim --.

Column 21,
Line 23, "values" should read -- of values --.
Line 25, "values" should read -- of values --.
Line 54, "34" should read -- 39 --.
Line 60, "34" should read -- 39 --.
Line 66, "36" should read -- 41 --.

Column 22,
Line 3, "36" should read -- 41 --.

Column 23,
Line 12, "coefficients" should read -- coefficient --.

Column 24,
Line 12, "coefficients" should read -- coefficient --.

Signed and Sealed this

Twelfth Day of November, 2002

Attest:

Attesting Officer

JAMES E. ROGAN
Director of the United States Patent and Trademark Office